United States Patent

Reisberg

[15] 3,653,440
[45] Apr. 4, 1972

[54] SECONDARY AND TERTIARY OIL RECOVERY PROCESS

[72] Inventor: Joseph Reisberg, Houston, Tex.
[73] Assignee: Shell Oil Company, New York, N.Y.
[22] Filed: Mar. 23, 1970
[21] Appl. No.: 21,799

[52] U.S. Cl. ............................................. 166/273
[51] Int. Cl. ........................................... E21b 43/22
[58] Field of Search ............................ 166/273–275

[56] References Cited

UNITED STATES PATENTS

| | | | |
|---|---|---|---|
| 3,529,668 | 9/1970 | Bernard | 166/273 |
| 3,474,864 | 10/1969 | Hurd | 166/273 X |
| 3,302,713 | 2/1967 | Ahearn et al. | 166/274 |
| 3,254,714 | 6/1966 | Gogarty et al. | 166/274 |
| 3,323,588 | 6/1967 | Rai et al. | 166/273 |
| 3,330,346 | 7/1967 | Jacobs et al. | 166/273 |
| 3,508,612 | 4/1970 | Reisberg et al. | 166/274 |

*Primary Examiner*—Stephen J. Novosad
*Attorney*—George G. Pritzker and J. H. McCarthy

[57] ABSTRACT

A waterflood process for producing oil from an underground reservoir is improved by injecting an oil-displacing surfactant system, a gas, and an aqueous drive liquid so that, within the reservoir, the relative permeability of liquid that is injected and displaced is reduced by the gas.

9 Claims, 2 Drawing Figures

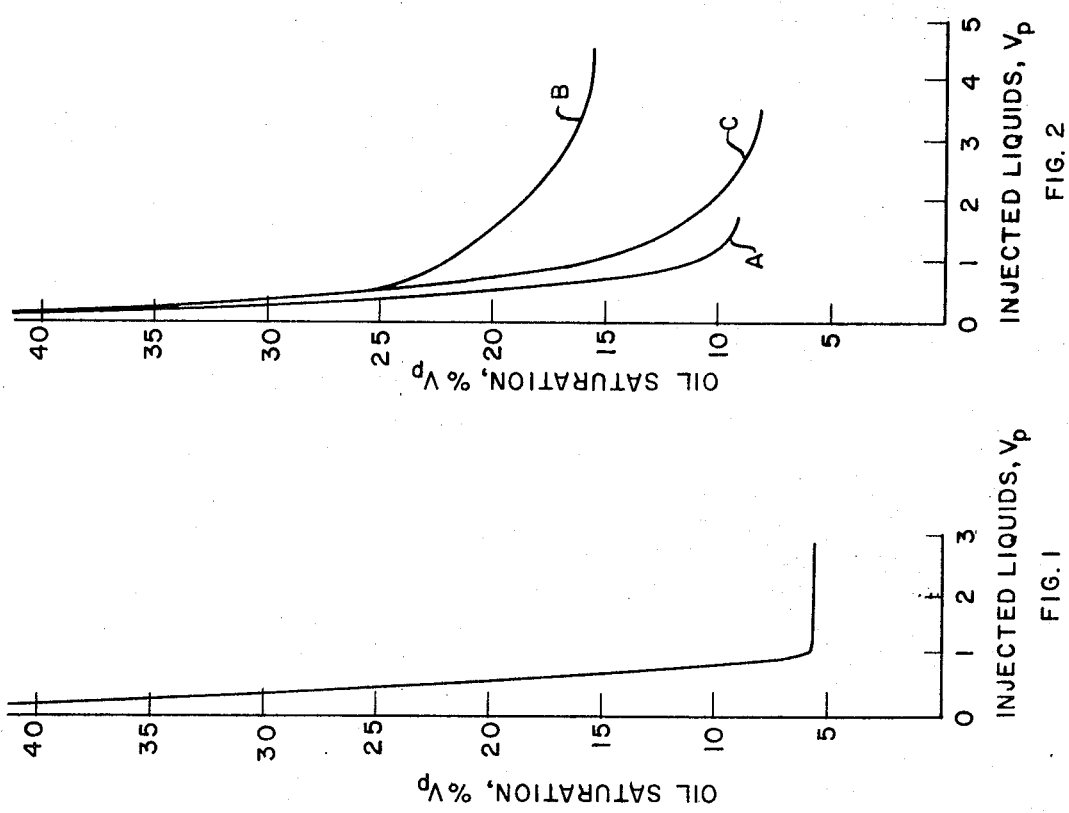

3,653,440

SECONDARY AND TERTIARY OIL RECOVERY PROCESS

BACKGROUND OF THE INVENTION

It is known that improved oil recovery can be effected by pretreating underground oil-containing formations with surfactant-containing systems, or micellar dispersions, which systems can be suitable liquids optionally containing electrolytes, followed by aqueous drive fluids. Such drive fluids often contain polymericmobility control agents or water thickeners such as hydrolyzed polyacrylamides, cellulose derivatives, biopolymers, etc. It has been found that the presence of such polymers in the drive fluid or pretreatment fluid are not particularly desirable when electrolytes are present in the formation fluids or pretreatment fluids because electrolytes tend to reduce the mobility control effectiveness of the polymers. In some cases such polymers react with components of the surfactant system and decrease the oil recovery effectiveness of such systems.

SUMMARY OF THE INVENTION

This invention improves a waterflood oil production process in which an "active" surfactant system is injected ahead of an aqueous fluid in order to enhance a displacement of oil toward a location from which oil is produced. In accordance with this invention, the oil is displaced by injecting the "active" surfactant system, a gas and an aqueous drive liquid. The gas and the aqueous drive liquid are injected in rates and amounts that cause the gas to move ahead of the liquid that is injected and displaced within the reservoir.

The process of this invention provides a mobility control that tends to maintain a favorable ratio of mobilities between the injected aqueous drive liquid and the surfactant system and oil that are displaced by the drive liquid. While the invention is not premised on any specific theory or mechanics of operation, it appears that the present type of mobility control is due to a reduction in relative permeability to liquid that is caused by the penetration of gas into the more permeable portions of the porous medium. The present mobility control is not dependent upon the formation or stability of a foam; although it is not adversely affected by the formation of a foam. This mobility control is relatively unaffected by the temperature and chemical composition of the reservoir in the sense that, with surfactant systems that are substantially equally effective and have substantially equivalent relative viscosities in reservoirs having significantly different temperature, e.g., from about 10° C to 150° C, or significantly different compositions, e.g., sandstones and/or limestones, similar effective ratios of aqueous drive liquid mobility to surfactant system mobility are produced by displacing the surfactant systems and oil by injections of the same gas and aqueous drive liquid in the same rates and amounts.

In general, an "active" surfactant system may comprise a substantially homogeneous liquid system that may contain both an oil and water phase and may have either as the continuous phase. The "active" surfactant systems have an interfacial tension against oil of less than $10^{-2}$ and, preferably less than $10^{-4}$ dyne per centimeter; but, due to the presence of the necessary optimum salt content, are generally poor foaming systems.

DESCRIPTION OF THE DRAWING

FIGS. 1 and 2 are plots of the oil saturations in permeable cores of earth formation material versus amounts of liquid injected.

DESCRIPTION OF THE INVENTION

Aqueous liquid "active" surfactant systems or slugs are preferred for use in the process of the present invention. Such a system can comprise an aqueous solution or dispersion in which a mixture, of a preferentially water-soluble surfactant and either or both of a preferentially oil-soluble surfactant and an amphiphilic or semipolar organic material, is dissolved, dispersed or solubilized, said aqueous solution can contain a substantially optimum amount of dissolved electrolyte. The preferred systems are exemplified by the surfactant micelle-organic amphiphile systems of U.S. Pat. No. 3,330,344, the sulfonate surfactant micelle-sulfonate surfactant amphiphile systems of U.S. Pat. No. 3,348,611 and the nonionic surfactant micelle-nonionic surfactant amphiphile systems of U.S. Pat. No. 3,455,386 as well as those described in copending applications Ser. No. 746,817, filed July 23, 1968, now U.S. Pat. No. 3,500,921 and 752,882 filed Aug. 15, 1968, now U.S. Pat. No. 3,508,612.

Active surfactant systems in which an oil-phase liquid is continuous (or external) are exemplified by the "micellar solutions, soluble oils, micro-emulsion, or 'Maraflood'" systems described in various patents mentioned above and publications, references such as World Oil, November 1967 and Feb. 1, 1970, or Oil and Gas J., Sept. 12, 1966.

The "active" surfactant slug can be one in which the continuous phase of the system is either an aqueous or non-aqueous phase and can be water, liquid hydrocarbon or can be a micro-emulsion in which the continuous or external phase can be water or oil, and preferably water, which continuous phase can contain an electrolyte so as to form a saline solution of optimum surface activity and also can contain materials for inhibiting clay swelling and improving permeability of the formation. The surfactants and co-surfactants can be of those described in U.S. Pat. Nos. 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511, and 3,469,630, as well as those described in copending applications Ser. No. 752,882, filed Aug. 15, 1968, now U.S. Pat. No. 3,508,612, Ser. No. 746,817, filed July 23, 1968, now U.S. Pat. No. 3,500,921, Ser. No. 751,261, filed Aug. 8, 1968, now U.S. Pat. No. 3,500,923, and Netherlands Pat. No. 6,812,398. The surfactants and/or micellar dispersants can be ionic, nonionic and/or cationic in character and those which are particularly preferred are the alkali metal organic sulfonates and also the sulfates of polyoxyalkylated aliphatic alcohols and mixtures thereof such as are described in copending applications mentioned above. The surfactants should be present in a concentration so as to form an "active" surfactant system or slug and by such a system or slug is meant one which exhibits an interfacial tension of at least as low as 0.01 dynes/cm between itself and the oil being displaced.

DESCRIPTION OF THE PREFERRED EMBODIMENT

A type of organic sulfonate surfactant that is particularly useful as one of the additives in the "active" surfactant system can be a mixture of substantially any surfactant salts or organic sulfonates provided that the mixture possesses surfactant-amphiphile properties generated by the oil-water solubility spectrum of the sulfonates. In such sulfonate surfactants, the oil-soluble (generally higher molecular weight) constituents serve as amphiphiles and are solublized in the aqueous system by the primarily water-soluble (generally lower molecular weight) sulfonate micelles. Anionic sulfonate surfactants of this type can be illustrated by metal or ammonium salts of sulfonate surfactants, e.g., alkali metal or ammonium salts of sulfonated petroleum hydrocarbons such as alkylated naphthalene sulfonates, alkylated benzene sulfonates; or the sulfocarbyoxylate salts, and the like. Preferred sulfonates are the alkali metal (Na, K, Li) or ammonium salts of petroleum sulfonates such as $C_{15-30}$ alkyl aryl sulfonates, alkylated benzene sulfonates and the like. Materials of this type are sold commercially under various trade names such as petroleum sulfonates sold by the Bray Chemical Company or the Bryton Chemical Company as Bryton Sulfonate, F, 430, 467, 500, or the Sonneborn Chemical Company as Petronates or the Socony Mobil Oil Company as "Promor" sulfonates of the SS-6, SS-20 series; American Cyanamid's "Aerosol OT"

which is Na dioctyl sulfosuccinate and the like. A preferred sulfonate mixture is a sodium salt of a petroleum sulfonate in the molecular weight range of 350–420 and a sodium salt of a petroleum sulfonate in the molecular weight range of 420–580 or a sodium salt of a mixture of petroleum sulfonates having an average molecular weight in the order of about 430–470, and mixtures of said sulfonates from the above low and high molecular weights.

The sulfated polyoxyalkylated organic material surfactant can be prepared by suitable means such as sulfating with chlorosulfonic acid, sulfur trioxide, sulfonic acid, oleum or sulfuric acid in a suitable solvent, a surface-active water soluble oxyalkylated organic material having from about eight to about 20 carbon atoms and represented by the general formula (I) represented by RO (RO'-O)$_x$—(RO''O)$_y$—(R'O)$_z$—H where R is an alkyl radical or organic moiety of eight to 20 and preferably 10 to 15 carbon atoms, R' and R'' are dissimilar alkyl radicals or groups from one to six carbon atoms and preferably are —C$_2$H$_4$— and —C$_3$H$_6$— radicals, respectively, $x$ and $z$ are positive integers of at least 1 and $y$ can be zero or a positive integer as $x$ or $z$. Preferred materials comprise oxylated alcoholic compounds such as oxyalkylated alkanols which can be represented by the general formula (II) represented by RO (C$_2$H$_4$O)$_{\overline{2-10}}$H where R is an alkyl radical of 10–15 carbon atoms, the alcohol used in the ethoxylation being a mixture of alcohols of 10–15 carbon atoms.

Sulfates of ethoxylated primary alcohols are commercially available from Shell Chemical Company under the trade name Neodol 23–3A having the formula C$_{12-13}$O(CH$_2$CH$_2$O)$_3$SO$_3$NH$_4$ and Neodol 25–3S of the formula C$_{12-15}$O(CH$_2$CH$_2$O)$_3$SO$_3$Na.

Other anionic sulfated ethoxylated alcohols are available from Union Carbide under the trade name Tergitol S such as Tergitol Anionic 14–S–3A (ammonium salt) or 15–S–3.0 (sodium salt) having the formula:

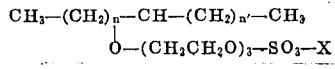

$$\text{CH}_3-(\text{CH}_2)_n-\text{CH}-(\text{CH}_2)_{n'}-\text{CH}_3$$
$$\overset{|}{\text{O}}-(\text{CH}_2\text{CH}_2\text{O})_3-\text{SO}_3-X$$

where X is NH$_4$ or Na.

Salts of sulfated polyoxylated alkyl phenols also can be used in combination with organic sulfonates.

The electrolytes used in the present "active" surfactant systems and/or aqueous drive liquids can be aqueous solutions of soluble inorganic salts or can be prepared from oil field produced water by blending with other sources. Suitable salts include the alkali metal or ammonium salts of anions such as the chlorides, sulfates, nitrates, carbonates or the like, or mixtures thereof. Preferred solutions are dilute or concentrated solutions of sodium chloride, i.e., brines. Preferred are brine solutions having a salt concentration of from 0.01 to 20 percent and preferably 0.1 and 0.5 meq/gm. The salt concentration is adjusted to give optimum interfacial activity as described in U.S. Pat. No. 3,348,611.

The gas used in the present invention can be nitrogen, flue gas, methane or other gaseous hydrocarbons such as ethane or propane, air, or the like. The aqueous drive liquid can contain dispersants, surfactants, or micellar materials which are used in the "active" surfactant systems but said surfactant materials are preferably present in the aqueous drive liquid in low concentrations with the aqueous drive liquids being incapable of functioning as "active" surfactant systems.

In the present process the sequence in which the surfactant system, gas and aqueous drive liquid are injected can be varied widely. A portion or slug of gas can be injected ahead of the surfactant system. Injections of slugs of gas and surfactant systems can be alternated. Injections of slugs of gas and aqueous drive liquid can be alternated. Injections of the gas and aqueous liquid can be substantially simultaneous. In a preferred sequence, at least most of the "active" surfactant system that is to be used is injected prior to the injection of any gas and injections of slugs of gas are alternated with injections of slugs of any remaining portion of the surfactant and the aqueous drive liquid.

The aqueous drive liquid preferably contains at least a small amount of surfactant. The amount of surfactant contained in the aqueous drive liquid can be relatively small, since the liquid may acquire surfactant by desorbing it from the rocks as the aqueous drive liquid flows through the earth formation. In general the surfactant concentration should be at least about 0.005 percent by weight and is preferably from about 0.05 to 0.2 percent by weight of the aqueous drive liquid. However, where the "active" surfactant system is one from which a significant amount of surfactant has been adsorbed on the surface of the earth formation, the aqueous drive liquid can be devoid of surfactant at the time of its injection into the earth formation. In such a situation, the amount of surfactant that is acquired by desorption is sufficient to satisfy the requirements for a gas-in-water dispersion mobility controlling procedure of the present invention.

In the present process, in one embodiment, a gas-in-water dispersion is formed by injecting alternate slugs of gas and aqueous drive liquid behind a slug of active surfactant system. The mobility of the gas-water dispersion is generally low relative to that of the "active" surfactant system, and functions to control the effective mobility of the adjacent surfactant system.

In various prior art processes, a thickened aqueous liquid such as a solution of a partially hydrolyzed polyacrylamide or biopolymer, etc., is positioned behind, or mixed with, a portion of the active surfactant system to function as a mobility controlling material. Such water-thickening materials have a tendency to be adversely affected by the electrolyte and possibly other components of the surfactant and/or reservoir fluids or by high temperature. In addition, such water thickeners have a tendency to be adsorbed on the rock surfaces of the reservoir. The adsorption causes a loss of reagent and thus a loss of mobility control. The extent of adsorption usually varies with variations in the composition of the reservoir rocks. Thus a formulation that provides good mobility control in a sandstone reservoir may provide little or none in a limestone reservoir.

The volume of "active" surfactant system used in this invention can range from about 5 to 30 percent of the pore volume of the swept zone of the reservoir, i.e., the portion through which the oil is to be displaced. The relative ratio of the amounts of gas and aqueous drive liquid that are injected can range from gas to liquid ratios of from about 0.1 to 10. The gas and aqueous drive liquid slugs are preferably from about 5 to 20 percent of the pore volume of the swept zone and the injection of the latter fluids is preferably continued until injected liquid appears at the production location.

TEST I

A surfactant system was injected into a 10-inch long, 2-inch diameter Berea core (530 md) as three 10% V$_p$ slugs of a 5 percent "active" surfactant solution containing 430 M.W. Na petroleum sulfonated (Bryton 430) and Neodol sulfate 25–3S in 4:1 ratio. Each surfactant slug was followed by nitrogen at a pressure of 1–2 p.s.i. A salt concentration of 0.5 M was utilized in these systems. The final gas slug was followed by water (0.025 M NaCl) and the effect of this treatment on oil desaturation is shown by the curve in FIG. 1. Note that the gas volume is not shown in this curve, which indicates only liquids.

Test II

An "active" chemical slug consisting of 25% V$_p$ of a 5 percent Bryton 430 sulfonate in 0.3 M NaCl was displaced alternately with slugs (0.1 V$_p$) of nitrogen and an aqueous drive liquid containing 0.2 percent sulfonate in 0.025 M NaCl at a rate of 1 ft/day through an oil-containing core. A total gas volume of 0.8 V$_p$ was injected. Results are shown in FIG. 2, curve A. S$_{orc}$ following injection of 0.76 V$_p$ of drive solution was 11.8% V$_p$ and following 1.25 V$_p$ of drive liquid it decreased to 9.3% V$_p$. Note that, as in FIG. 1, the gas volume is not shown.

To determine the effect of a polyacrylamide polymer drive as opposed to the gas injection, a test was performed wherein the "active" chemical slug was displaced by a solution of 0.04 percent Separan AP 30 (a polyacrylamide) in 0.025 M NaCl having a viscosity of 6.1 cp and the result is shown in FIG. 2, curve C. Here, too, the oil recovery was less efficient than that obtained when gas was injected.

Effect of Drive Liquid

In previous tests the drive liquid used in conjunction with gas was a dilute form of the "active" surfactant slug. Used at a concentration of 0.2 percent it is not "active" for oil recovery but it nevertheless exhibits a low gas-water surface tension of about 30 dynes/cm. This helps deform the gas bubbles, reduces their size and effects a greater degree of dispersion of the gas than occurs in the absence of surfactant. To learn whether this is really necessary, an experiment was performed in which the surfactant was omitted from the drive liquid. A 0.025 M NaCl solution was used instead. Results are shown in the table as No. 3, indicating that ultimate oil recovery is good but not as good as that obtained with a small amount of the surfactant in the drive liquid.

No Chemical Slug

In the process of the present invention, a variety of fluids were introduced into the porous medium including the "active" surfactant-electrolyte slug, "non-active" dilute surfactant, gas and dilute salt solution. The extent to which these various constituents contribute to oil recovery was studied in a number of tests where the "active" chemical slug was omitted.

A. Flood With Dilute Salt Solution and Gas

Following the waterflood to residual oil saturation, a sequence of alternating 10% $V_p$ slugs of nitrogen and dilute salt solution (0.025 M) was introduced. No surfactant was used and the results shown in Table 1 as No. 4 indicate that oil recovery efficiency was poor. Oil saturation was reduced by little more than 10% $V_p$. This shows that gas by itself does produce some oil—but not as much as can be produced in conjunction with the surfactant.

B. Flood With Dilute Surfactant Solution and Gas

The combination of gas and the dilute, "non-active" surface-active drive liquid as a contributor to the oil recovery was put to test in an experiment in which gas and a solution of 0.2 percent Bryton 430 in 0.025 M NaCl was introduced immediately following the waterflood to $S_{or}$. Results appear in Table 1 as No. 5, showing little improvement in oil recovery over No. 4.

C. Flood With Dilute Surfactant—No Gas M NaCl.

A flood test was performed with 0.2 percent Bryton 430 in 0.025 M NaCl As shown in Table 1 (No. 6), negligible oil recovery was obtained.

It can be concluded that the combination of an "active" micellar slug driven by a gas-water system gives unique and improved degree of oil recovery.

D. Salt Compatibility

In this experiment a sulfated ethoxylated alcohol was blended with the petroleum sulfonated. This increases salt compatability as noted in copending patent application, Ser. No. 752,882, filed Aug. 15, 1968. From Table 1, No. 7, it is shown that one $V_p$ of injected liquid (25% $V_p$ of active slug and drive liquid) reduced oil saturation to 11% $V_p$ and a continued injection of drive fluids reduced saturation to 9% $V_p$. This indicates the applicability of gas-enhanced drive to a variety of active chemical slugs.

Surfactant systems of this invention are also thermally stable and are effective under high temperature use. Thus, the following tests were made and results are shown in Table 2.

Three experiments were performed in 10-inch long Berea cores using 5 percent Bryton 430 sulfonate in 0.5 M NaCl as the "active" surfactant at 90° C. At this temperature the optimum salt concentration is higher than at room temperature. One run was made using an infinite slug. Another with a 25% $V_p$ slug and polymer drive and a third with a 25% $V_p$ slug driven by alternate slugs of water and gas. The experiments were performed in a constant temperature air bath. A back pressure of 15 p.s.i. was maintained on the cores to prevent flashing of the oil.

In the first experiment, Table 2 (No. 1) using an infinite slug, oil saturation following 1 $V_p$ of the chemical, was reduced to 14.3% $V_p$.

After 1.5 $V_p$ of chemical flood, oil saturation was reduced to 4.0% $V_p$. Experiment No. 2 was performed with a 25% $V_p$ slug of chemical containing 250 Separan AP 30 (polyacrylamide). This was driven by an aqueous solution of 0.025 M NaCl containing 250 ppm Separan AP 30. Results with this slug were inferior to those obtained with the infinite slug lacking the polymer. Following 1 $V_p$ of injected liquid (slug plus 0.75% $V_p$ of drive liquid) oil saturation was reduced to 19.4% $V_p$. With 2 $V_p$ of injected liquid, oil saturation was reduced to 6.5% $V_p$. The third experiment (No. 3) was performed with a 25% $V_p$ slug of sulfonate (no polymer) followed with alternate 10% $V_p$ slugs of dilute chemical (0.2% sulfonate) and nitrogen. As shown in Table 2, one $V_p$ of treatment reduced oil saturation TABLE 1.—RECOVERY OF BENTON CRUDE FROM POROUS MEDIA WITH CHEMICAL SLUGS AND GAS-ENHANCED LIQUID DRIVE Volume chemical slug=25% $V_p$
Gas and drive fluid introduced as alternate 10% $V_p$ slugs

| Test No. | Type of porous medium | Orientation | $S_{or}$, percent $V_p$ | Chemical composition | | Presence of gas | Oil sat'n following liquid volumes shown (slug plus drive liquid)* | | |
|---|---|---|---|---|---|---|---|---|---|
| | | | | Active slug | Drive liquid | | 1 $V_p$ | 1.5 $V_p$ | 2.0 $V_p$ |
| 1 | Berea core | Horizontal | 42.7 | 5% bryton 430, 0.3 M NaCl | 0.2% bryton 430, 0.025 M NaCl | + | 11.5 | 10.0 | 9.7 |
| 2 | do | Vertical | 42.8 | do | do | + | 10.5 | 9.3 | 9.3 |
| 3 | do | do | 40.6 | do | 0.025 M NaCl | + | 14.0 | 10.5 | 9.8 |
| 4 | do | do | 41.4 | | 0.025 M NaCl | + | 30.5 | 29.5 | 29.2 |
| 5 | do | do | 42.4 | | 0.2% bryton 430, 0.025 M NaCl | + | 28.9 | 28.2 | 28.2 |
| 6 | do | do | 41.6 | | do | − | 39.0 | 38.5 | 38.0 |
| 7 | do | do | 41.3 | 4% bryton 430, 1% neodol®, 25-3S, 0.9 M NaCl. | 0.16% bryton 430, 0.04% Neodol 25-3S, 0.025 M NaCl. | + | 11.0 | 9.0 | 8.5 |

*Gas volume (not shown) equal to drive liquid volume.

TABLE 2.—THE RECOVERY OF PETROLEUM FROM BEREA CORES AT 90° C. WITH SURFACTANT SLUGS AND GAS ENHANCED LIQUID DRIVE

Gas and drive liquid introduced as alternate 10% $V_p$ slugs

| Exper. Ref. No. | $S_{or}$, percent $V_p$ | Chemical composition | | Active slug size, % $V_p$ | Presence of gas | Oil saturation following liquid volume shown (slug plus drive liquid) | | | |
|---|---|---|---|---|---|---|---|---|---|
| | | Active slug | Drive liquid | | | 1.0 $V_p$ | 1.25 $V_p$ | 1.5 $V_p$ | 2.0 $V_p$ |
| 1 | 40.9 | 5% Bryton 430, 0.5 M NaCl | 0.025 M NaCl | Infinite | | 14.3 | 8.1 | 4.0 | 2.0 |
| 2 | 36.4 | 5% Bryton 430, 0.5 M NaCl, 250 p.p.m. Separan AP30. | 250 p.p.m. Separan AP30, 0.025 M NaCl. | 25 | | 19.4 | 13.0 | 10.5 | 6.5 |
| 3 | 39.7 | 5% Bryton 430, 0.5 M Nacl | 0.2% Bryton 430, 0.225 M NaCl | 25 | + | 8.0 | 5.5 | 2.5 | 2.1 | to 8% $V_p$. Following 1.5 $V_p$ of slug plus drive water, oil saturation was 2.5% $V_p$. Thus, it is shown that, with the aid of an injected gas phase, the results obtained at room temperature are sustained at elevated temperature.

I claim as my invention:

1. In an oil-producing process in which oil in an oil-containing reservoir formation is displaced, the steps comprising:

injecting through an injection well a slug of active surfactant system, followed by slugs of gas, and aqueous drive liquid;

said active surfactant system consisting essentially of a substantially homogeneous liquid that contains sufficient interfacial tension lowering surfactant and dissolved electrolyte to provide a surfactant system that has an interfacial tension of less than about 0.01 dyne per centimeter between it and the reservoir oil and is a generally poor foaming system;

said aqueous drive liquid consisting essentially of aqueous liquid containing from about 0.005 to 0.2% by weight interfacial tension lowering surfactant; and injecting the gas and the aqueous drive liquid in rates and amounts that cause the gas to move ahead of the liquid that is injected and displaced within the reservoir formation.

2. The process of claim 1 wherein the surfactant is an organic sulfonate and the injected gas is selected from the group consisting of air, nitrogen, $CO_2$, flue gases, and gaseous hydrocarbons.

3. The process of claim 2 wherein the active surfactant system is an aqueous solution containing an organic sulfonate and an organic sulfate.

4. The process of claim 3 wherein the aqueous drive liquid is saline.

5. The process of claim 4 wherein the total volume of injected active surfactant system is from about 5 to 30 percent of the pore volume of the swept zone of the reservoir formation.

6. The process of claim 5 wherein the active surfactant system is an aqueous dispersion containing an organic sulfonate, the injected gas is nitrogen, and the injected aqueous drive liquid contains an organic sulfonate.

7. The process of claim 1 wherein the active surfactant system is an aqueous solution containing an organic sulfonate and the injected gas is nitrogen.

8. The process of claim 1 wherein an injection of most of the active surfactant system precedes a substantially simultaneous injection of the gas and aqueous drive liquid.

9. The process of claim 1 wherein an injection of at least the bulk of the active surfactant system precedes an injection of alternating slugs of the gas and the aqueous drive liquid, with each of said slugs amounting to about 10% of the pore volume of the swept zone.

* * * * *